United States Patent Office 3,409,653
Patented Nov. 5, 1968

3,409,653
DIBUTYLTIN BIS (2,4-DINITRO-6-ALKYL-PHENOLATES)
Walter A. Stamm, Tarrytown, N.Y., assignor to Stauffer Chemical Company, New York, N.Y., a corporation of Delaware
No Drawing. Continuation-in-part of application Ser. No. 286,521, June 10, 1963. This application Oct. 26, 1966, Ser. No. 589,498
2 Claims. (Cl. 260—429.7)

---

ABSTRACT OF THE DISCLOSURE

Organotin compounds of the formula:

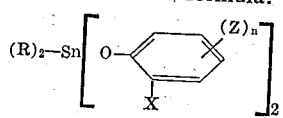

wherein R is alkyl of from 1 to 12 carbon atoms, X is selected from lower alkoxyl, nitro, alkyl of from 1 to 9 carbon atoms, chlorine and bromine, Z is selected from nitro, lower alkoxyl, alkyl of from 1 to 9 carbon atoms, chlorine and bromine and $n$ is an integer of from 1 to 2, it being provided that at least one of the para and ortho positions of the phenoxy ring always has attached thereto at least one nitro group.

---

This application is a continuation-in-part of U.S. Ser. No. 286,521 filed June 10, 1963, and now abandoned.

This invention relates to organotin compounds. In particular, the invention pertains to ortho-substituted dialkyltin bis-nitrophenolates and the method of preparing them.

The dialkyltin bis-phenolates constitute a class of organic tin derivatives which are distinguished by a characteristic tendency to undergo hydrolytic cleavage. Even moist air suffices to effect hydrolysis of the more reactive members. As a consequence it has proved difficult and often impractical to attempt a determination of the utility of these compounds. For instance, the moisture instability of the dialkyltin bis-phenolates precludes a reliable measurement of their biocidal activity since any evaluation or testing would not normally be conducted under anhydrous conditions. Even if biocidal activity could be demonstrated, the ephemeral nature of the dialkyltin bis-phenolates militates against their use or incorporation in commercial biocidal formulations which commonly contain the active component dispersed in aqueous medium. The exploitation of other applications and uses of this type of organotin derivatives has in varying degrees been handicapped because of their proneness toward moisture instability.

It is, therefore, the primary object of this invention to provide a class of dialkyltin bis-phenolates which are stable in the presence of moisture or in aqueous media. It is a further object of the invention to provide a method of producing the aforesaid compounds. Other objects and purposes will become apparent subsequently herein.

In accordance with the present invention, it has been discovered that a class of symmetrical dialkyltin bis-phenolates can be produced having a remarkable degree of stability in the presence of moisture by introducing a substituent at one of the ortho positions of the phenoxy ring while at least one of the remaining ortho or para positions is provided with a nitro group. The aforesaid arrangement can be conveniently depicted by the following general formula:

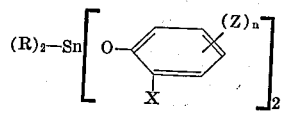

wherein R is alkyl of from 1 to 12 carbon atoms, e.g., methyl, ethyl, n-propyl, isobutyl, n-butyl, n-pentyl, n-hexyl, n-heptyl, n-octyl, isooctyl, n-nonyl, n-decyl, n-dodecyl, and the like; X represents lower alkoxyl, a nitro group, alkyl of from 1 to 9 carbon atoms, a halogen such as chlorine or bromine, Z represents a nitro group, lower alkoxyl, alkyl of from 1 to 9 carbon atoms and a halogen such as chlorine or bromine and $n$ is an integer of from 1 to 2, it being understood that at least one of the para and ortho positions of the phenoxy ring always has attached thereto a nitro group. It will be observed that one nitro group can fulfill the role of the essential ortho substituent while a second nitro group may occupy one of the remaining ortho or para positions of the phenoxy ring. Exemplary structures which can be taken as illustrative of the general formula include the following:

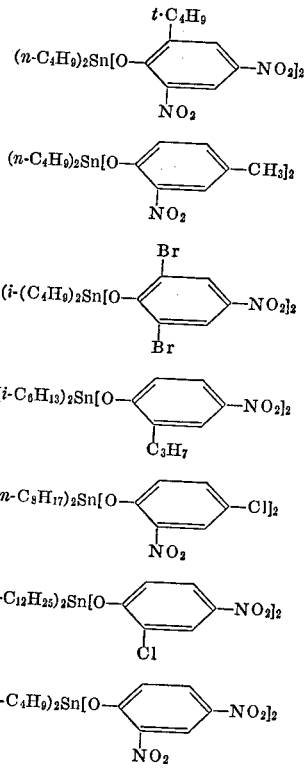

In preparing the new and novel dialkyltin bisphenolates of the present invention, it has been ascertained that excellent results are obtained by reacting approximately one mole of the requisite dialkyltin oxide with approximately two moles of the respective free nitrophenol component. The reaction is conveniently carried out by refluxing the components in the presence of a normally liquid organic solvent while removing the water of reaction by azeotropic distillation. Organic solvents which have proved especially suitable are the normally liquid aromatic hydrocarbons such as benzene, toluene, xylene, mesitylene, as well as the medium to high boiling saturated aliphatic hydrocarbons such as hexane, cyclohexane, heptane, and the various ligroins.

Reference is now made to the following examples which are inserted for the purpose of illustrating the invention in greater detail. It is to be pointed out, however, that different modifications in practicing the invention will be evident to those skilled in the art without departing from the scope or spirit of the said invention.

Example 1.—Dibutyltin bis-(2,4-dinitro-6-t-butyl-phenolate)

A 1000 cc. reaction flask, equipped with a stirrer, a condenser and a Dean-Stark trap was charged with 50 gr. of 2,4-dinitro-6-t-butyl-phenol (0.21 mole), 25 gr. of di-butyltin oxide (0.105 mole) and 400 cc. of benzene. The mixture was brought to reflux with stirring. After about one hour of reflux all reactants had dissolved, and 1.8 cc. of water had been collected in the Dean-Stark trap. Benzene was then completely removed by distillation. The reaction product was obtained in quantitative yield (71.5). It was a yellow, viscous, undistillable oil.

Example 2.—Dibutyltin bis-(2-nitro-4-methyl-phenolate)

Powdered di-n-butyltin oxide, 12.5 gr. (0.05 mole), and 15.3 gr. of 4-methyl-2-nitro-phenol (0.1 mole) were dispersed in 120 cc. of benzene. After 2 hrs. of reflux 0.7 cc. of $H_2O$ had been collected in a Dean-Stark trap, and all dibutyltin oxide had reacted, as indicated by the clear solution. Benzene was removed by distillation, and a light yellow, crystalline material was obtained as residue in quantitative yield (27 gr); M.P. 46° C. The elemental analysis confirmed the proposed structure.

Example 3.—Di-i-butyltin bis-(2,6-dibromo-4-nitro-phenol)

This compound was obtained in quantitative yield by refluxing one mole of diisobutyltin oxide with two moles of 2,6-dibromo-4-nitrophenol for 2 hrs. in toluene.

The reaction product is a yellow, undistillable oil.

Example 4.—Dibutyltin bis-(2,4-dinitro-6-sec-butyl-phenolate)

A 1000 cc. reaction flask, equipped with a stirrer, a condenser and a Dean-Stark trap was charged with 24 grams (0.1 mole) of 2,4-dinitro-6-sec-butyl phenolate, 15.2 grams (0.05 mole) dibutyltin dichloride, 8.8 grams of sodium bicarbonate, and 125 cc. of toluene. The mixture was agitated and brought to reflux. After a period of 5 hours, 0.8 cc. of water had collected in the Dean-Stark trap. The reaction mixture was allowed to cool to room temperature and the benzene solvent was removed by distillation. The reaction product was obtained in quantitative yield (71.0 grams). It was a red, viscous, undistillable oil.

The dialkyltin bis-ortho-substituted nitrophenolates of the invention have been found to exhibit a variety of new and useful properties and are moreover not plagued by the hydrolytic or moisture instability characteristic of the hitherto known dialkyltin bis-phenolates. It has, for instance, been ascertained that the compounds of the invention are effective as herbicides, fungicides and insecticides. In this connection, reference is made to Example 1 which when employed at a concentration of 20 pounds/80 gal./ acre gave complete control of such noxious vegetative growths as crabgrass, annual bluegrass, water grass, wild oat, pigweed and Indian Mustard. Post-emergence application of the same compound at a rate of 2 lbs./acre resulted in death or complete eradication of Foxtail and Mustard after twenty-one days. Other types of pesticidal organisms which have been found to be susceptible to the compounds of the invention include the common house fly, *Musca domestica*, and the American cockroach, *Periplaneta americana*. The compounds are unusually effective against various parasitic protozoa such as poultry coccidia to include *Eimeria acervulina*, *Eimeria tenella*, and *Eimeria necatrix*. The compounds are particularly effective against Eimeria necatrix. For example the compound of Example 4 is found to completely control *Eimeria necatrix* at a concentration of 250 parts per million. By using the compounds of the invention in relatively dilute concentrations, they were found to be effective in controlling rust and mildew without injuring the host plants.

I claim:
1. Dibutyltin bis-(2,4-dinitro-6-t-butyl-phenolate).
2. Dibutyltin bis-(2,4-dinitro-6-sec-butyl-phenolate).

References Cited

FOREIGN PATENTS 797,073  6/1958  Great Britain.

TOBIAS E. LEVOW, *Primary Examiner.*

W. F. W. BELLAMY, *Assistant Examiner.*